United States Patent [19]
Miller et al.

[11] Patent Number: 5,503,665
[45] Date of Patent: Apr. 2, 1996

[54] LATENT IMAGE COMPOSITIONS

[75] Inventors: Richard E. Miller, Nazareth, Pa.; Charlene Couch, Richmond, Va.

[73] Assignee: Binney & Smith Inc., Easton, Pa.

[21] Appl. No.: 317,321

[22] Filed: Oct. 4, 1994

Related U.S. Application Data

[63] Continuation-in-part of Ser. No. 78,722, Jun. 16, 1993, Pat. No. 5,352,282, and Ser. No. 270,454, Jul. 5, 1994, and Ser. No. 270,485, Jul. 5, 1994, and Ser. No. 270,940, Jul. 5, 1994, and Ser. No. 270,998, Jul. 5, 1994, Pat. No. 5,478,382, each is a continuation-in-part of Ser. No.923,308, Jul. 31, 1992, Pat. No. 5,232,494, said Ser. No. 270,454, and Ser. No. 270,485, and Ser. No. 270,940, and Ser. No. 270,998, each is a continuation-in-part of Ser. No.89,503, Jul. 16, 1993, Pat. No. 5,326,388, which is a continuation-in-part of Ser. No. 923,308.

[51] Int. Cl.$^6$ ................................................ C09D 11/02
[52] U.S. Cl. .................. 106/21 R; 106/21 A; 106/20 A; 106/22 B
[58] Field of Search ............... 106/21 R, 21 A, 106/22 B, 20 A

[56] References Cited

U.S. PATENT DOCUMENTS

| | | | |
|---|---|---|---|
| 1,550,048 | 8/1925 | Ruben | 401/194 |
| 2,086,745 | 8/1935 | Sell | 106/22 B |
| 2,305,098 | 7/1940 | Minnear | 106/23 B |
| 2,453,201 | 11/1948 | Cushman | 401/207 |
| 2,555,474 | 7/1951 | deVries | 106/22 H |
| 2,559,608 | 11/1951 | Ehrlich | 106/22 A |
| 2,589,306 | 3/1952 | Steiner | 106/22 A |
| 3,221,361 | 12/1965 | Cline | 401/198 |
| 3,400,003 | 8/1966 | Guertin | 106/22 R |
| 3,617,325 | 6/1969 | Spokes et al. | 427/145 |
| 3,627,546 | 12/1971 | Coppeta | 106/21 A |
| 3,672,842 | 6/1972 | Florin | 106/21 A |
| 3,700,603 | 6/1972 | Rembaum | 106/21 A |
| 3,705,045 | 12/1972 | Nadolski | 106/22 D |
| 3,870,435 | 3/1975 | Watanabe et al. | 427/145 |
| 3,873,185 | 3/1975 | Rogers | 430/4 |
| 3,876,496 | 4/1975 | Lozano | 106/21 A |
| 3,886,083 | 5/1975 | Laxer | 106/21 A |
| 3,941,488 | 3/1976 | Maxwell | 401/17 |
| 3,945,836 | 3/1976 | Miyata | 106/22 R |
| 3,945,837 | 3/1976 | Miyata et al. | 106/22 D |
| 3,952,314 | 4/1976 | Maltz | 401/194 |
| 3,957,495 | 5/1976 | Teranishi et al. | 106/19 E |
| 3,966,400 | 6/1976 | Birke et al. | 8/478 |
| 3,979,550 | 9/1976 | Panken | 106/21 R |
| 3,982,251 | 9/1976 | Hochberg | 106/21 A |
| 3,990,839 | 11/1976 | von der Eltz et al. | 8/14 |
| 4,028,118 | 6/1977 | Nakasuji et al. | 160/21 E |
| 4,070,194 | 1/1978 | Arakawa | 106/21 R |
| 4,071,645 | 1/1978 | Kahn | 106/6 |
| 4,098,738 | 7/1978 | Buerkley et al. | 106/21 R |
| 4,139,965 | 2/1979 | Curry et al. | 427/333 |
| 4,162,164 | 7/1979 | Lin | 106/21 R |
| 4,171,982 | 10/1979 | Lin | 106/21 A |
| 4,176,361 | 11/1979 | Kawada et al. | 106/20 R |
| 4,188,431 | 2/1980 | Sokol et al. | 106/21 A |
| 4,193,906 | 3/1980 | Hatanaka | 106/23 B |
| 4,212,676 | 7/1980 | Ueda | 106/19 B |
| 4,213,717 | 7/1980 | Lin | 106/22 B |
| 4,227,930 | 10/1980 | Lin | 106/22 B |
| 4,246,033 | 1/1981 | von Wartburg | 106/23 B |
| 4,252,845 | 2/1981 | Griffiths et al. | 106/21 A |
| 4,256,494 | 3/1981 | Yamamoto et al. | 106/22 A |
| 4,262,935 | 4/1981 | Anderson et al. | 503/208 |
| 4,322,466 | 3/1982 | Tomlinson | 106/21 R |
| 4,352,691 | 10/1982 | Owatari et al. | 106/22 R |
| 4,381,946 | 5/1983 | Uehara et al. | 106/22 K |
| 4,413,266 | 11/1983 | Aviram et al. | 106/22 B |
| 4,428,994 | 1/1984 | Rawlins | 427/260 |
| 4,441,928 | 4/1984 | Iijima | 106/21 A |
| 4,460,727 | 7/1984 | Shoji | 106/23 R |
| 4,490,177 | 12/1984 | Shioi et al. | 106/22 R |
| 4,505,749 | 3/1985 | Kanekiyo et al. | 106/22 R |
| 4,525,214 | 6/1985 | Panken | 106/19 B |
| 4,525,215 | 6/1985 | Shioi et al. | 106/22 R |
| 4,525,216 | 6/1985 | Nakanishi | 106/23 B |

(List continued on next page.)

FOREIGN PATENT DOCUMENTS

| | | |
|---|---|---|
| 282178 | 2/1988 | European Pat. Off. . |
| 289141 | 3/1988 | European Pat. Off. . |
| 352796 | 7/1989 | European Pat. Off. . |
| 506452 | 3/1992 | European Pat. Off. . |
| 2241653 | 3/1975 | France . |
| 2487372 | 3/1981 | France . |
| 551775 | 5/1927 | Germany . |
| 2015829 | 10/1971 | Germany . |
| 2724820 | 6/1977 | Germany . |
| 2834459 | 8/1978 | Germany . |
| 2927005 | 7/1979 | Germany . |
| 2927006 | 7/1979 | Germany . |
| 3207217 | 2/1982 | Germany . |
| 59-86672 | 5/1984 | Japan . |
| 59-179572 | 10/1984 | Japan . |
| 62-28834 | 7/1987 | Japan . |
| 159483 | 7/1988 | Japan . |
| 1-103676 | 4/1989 | Japan . |
| 3-243673 | 10/1991 | Japan . |
| 1455678 | 1/1975 | United Kingdom . |
| 94/06872 | 9/1992 | WIPO . |

OTHER PUBLICATIONS

Photocopy of the Packaging Material, Binney & Smith, Inc., Easton, Pa. (1992).
"Color Fibre Pen Inks", BASF Brochure, (1979).

*Primary Examiner*—Helene Klemanski
*Attorney, Agent, or Firm*—Leydig, Voit & Mayer, Ltd.

[57] ABSTRACT

A coloring system is provided in which an undercolor composition is applied to a substrate to thereby leave a colorless mark. The undercolor composition is then written over with an overcolor composition, thereby causing the undercolor mark to become colored. The overcolor composition may itself contain a colorant. In one embodiment, the color-changing effects are accomplished by employing a dye that is colorless in the presence of high pH and/or a reducing agent, but that becomes colored as the pH is lowered, as the undercolor colorant. In a second embodiment, the color-changing effects are accomplished by employing a dye that is colorless at low pH, but that becomes colored as the pH is raised, as the undercolor colorant.

15 Claims, No Drawings

U.S. PATENT DOCUMENTS

| | | | |
|---|---|---|---|
| 4,557,618 | 12/1985 | Iwata et al. | 106/20 R |
| 4,578,117 | 3/1986 | Nakanishi | 106/20 A |
| 4,604,139 | 8/1986 | Shioi et al. | 106/23 C |
| 4,620,941 | 11/1986 | Yoshikawa et al. | 252/408.1 |
| 4,681,471 | 7/1987 | Hayduchok et al. | 106/22 B |
| 4,708,817 | 11/1987 | Dudnick | 106/22 B |
| 4,725,316 | 2/1988 | Mahany, II | 106/499 |
| 4,732,614 | 3/1988 | Brooks et al. | 106/23 B |
| 4,744,826 | 5/1988 | Iijima | 106/20 A |
| 4,746,936 | 5/1988 | Takahashi | 401/195 |
| 4,778,525 | 10/1988 | Kobayashi et al. | 106/22 B |
| 4,889,559 | 12/1989 | Goldberg et al. | 106/21 C |
| 4,907,903 | 3/1990 | Kawashima | 106/21 R |
| 4,942,185 | 7/1990 | Inoue et al. | 521/54 |
| 4,954,174 | 9/1990 | Imagawa | 106/27 R |
| 4,954,544 | 9/1990 | Chandaria | 524/111 |
| 4,973,499 | 11/1990 | Iwata et al. | 106/22 R |
| 4,988,123 | 1/1991 | Lin et al. | 106/23 R |
| 5,004,763 | 4/1991 | Imagawa | 523/161 |
| 5,006,171 | 4/1991 | Mecke et al. | 106/20 A |
| 5,009,536 | 4/1991 | Inoue et al. | 106/20 C |
| 5,017,226 | 5/1991 | Kulisz | 106/21 C |
| 5,024,699 | 6/1991 | Llyama et al. | 106/21 R |
| 5,043,013 | 8/1991 | Kluger et al. | 106/20 R |
| 5,082,386 | 1/1992 | Hironaka et al. | 401/206 |
| 5,106,881 | 4/1992 | Inoue et al. | 521/54 |
| 5,118,350 | 6/1992 | Prasad | 106/22 R |
| 5,120,359 | 6/1992 | Uzukawa et al. | 106/20 A |
| 5,139,572 | 8/1992 | Kawashima | 106/21 R |
| 5,176,746 | 1/1993 | Nakanishi et al. | 106/25 R |
| 5,196,237 | 3/1993 | May | 106/19 B |
| 5,196,243 | 3/1993 | Kawashima | 106/21 R |
| 5,203,913 | 4/1993 | Yamamoto et al. | 106/22 B |
| 5,215,956 | 6/1993 | Kawashima | 106/21 R |
| 5,222,823 | 6/1993 | Conforti | 106/22 B |
| 5,232,494 | 8/1993 | Miller | 106/22 B |
| 5,262,535 | 11/1993 | Kaiser | 106/22 B |
| 5,279,859 | 1/1994 | May | 106/19 B |
| 5,302,194 | 4/1994 | Tanabe et al. | 106/21 A |
| 5,320,668 | 6/1994 | Shields et al. | 106/20 R |

LATENT IMAGE COMPOSITIONS

RELATED APPLICATIONS

This application is a continuation-in-part of U.S. patent application Ser. No. 08/078,722, which will issue as U.S. Pat. No. 5,352,282 on Oct. 4, 1994, which application was a continuation of previous U.S. patent application Ser. No. 07/923,308, which issued as U.S. Pat. No. 5,232,494 on Aug. 3, 1993. This application also is a continuation-in-part of U.S. patent application Ser. Nos. 08/270,454, 08/270,485, 08/270,940, and 08/270,998 now U.S. Pat. No. 5,478,382, all filed Jul. 5, 1994, and all which were continuation-in-part applications of U.S. patent application Ser. No. 08/089,503, which issued as U.S. Pat. No. 5,326,388 on Jul. 5, 1994 and which was a continuation-in-part of U.S. patent application Ser. No. 07/923,308 which issued as U.S. Pat. No. 5,232,494 on Aug. 3, 1993.

FIELD OF THE INVENTION

This invention relates generally to the field of coloring compositions and more particularly to a pair of compositions which may be used in conjunction with each other to enable laying down an initial colorless mark using an undercolor coloring composition and then using an overcolor aqueous composition to enable the development or revealing of the color of a portion or the entirety of the initial colorless mark.

BACKGROUND OF THE INVENTION

Children enjoy various drawing and coloring activities using a variety of mediums. Useful in such activities are markers containing inks, crayons, pencils of various colors, and various paints including water colors, oil paints and acrylic paints. However, children would often like to change the color of a mark after they have made the mark. One instance would be the desire to add a yellow sun over a previously colored blue sky. Children would also like to reveal a hidden color on an otherwise apparently blank page. For example, the child can reveal a yellow sun which was previously hidden.

Changing the color of a mark or uncovering a color from its previously colorless state is not readily done with the typical children's coloring instruments such as those described. In the past, children changed the marks by placing the mark of one color over the mark of another color. When performing this using traditional marking pens, the marks produced are often not the desired colors and the tips of the markers get soiled with the other inks, rendering the marker useless. If color changing is attempted with traditional children's paints, the colors tend to bleed together resulting in undesirable color smears. Therefore, there has been a long felt need for coloring compositions and coloring systems which produce marks of a first color that can be readily changed into a wide variety of second colors. There has also been a need for coloring compositions and coloring systems wherein a first mark of a color in its colorless state that can be changed to reveal the color of the colorant may be created.

Coloring compositions generally are mixtures of a coloring matter dispersed or dissolved in a carrier fluid. The colorant, if readily dissolving in the carrier fluid, is termed a dye. An insoluble coloring material is termed a pigment. Pigments are finely ground solid materials and the nature and amount of pigment contained in an ink determines its color.

In one available marker application, a child is able to change a specific initial mark laid down to a second specific color by applying a reducing agent to the first mark yielding a change in color. The marker inks used in these markers are typically prepared by blending a reducing agent (sometimes termed a bleaching agent) or pH sensitive dye with a dye that is stable in reducing agent or high pH. For example, German Patent Specification No. 2724820, (hereinafter "the German Patent"), concerns the combining of a chemically stable dye and a chemically unstable dye in an ink formulation. Once a mark using this combination of stable and unstable dyes is laid down, the mark may be overwritten with a clear reducing agent solution, eliminating the color contribution of the unstable dye. The resulting mark of the stable dye, with its characteristic color, remains.

There are several drawbacks to such a marking system. First, there are strict limitations on the number of color changes which may be produced. Specifically, in formulations made according to the German Patent, the particular ink composition may only be changed from a first color to a fixed second color. For example, a green mark may only be changed to a violet color as the inks are described in the practice of the German Patent. In addition, since one of the required pair of markers contains only the reducing agent, that reducing agent marker cannot render a visible mark and may only be used in combination with the base color marker. Once the base color marker is used up, the reducing agent marker is of no use. Or, once the reducing agent marker is used up, the base color marker may only be used for the color which it initially marks with.

Coloring compositions may also optionally include such ingredients as humectants, surfactants, preservatives, and drying agents. Humectants function to improve freeze/thaw stability and to control drying out of the tip when the coloring composition is used as a marker ink. Preservatives serve the obvious function of preventing spoilage of the ink during the expected shelf life of the marker product. Drying agents speed drying of a mark laid down by a marker.

Therefore, an object of the present invention is to provide a coloring composition system which is capable of enhanced multiple color changing abilities.

An additional object of the present invention is to produce a coloring composition system which includes a dye in its colorless state which can be chemically altered to produce the dye in its colored state.

These and other objects will become apparent to those skilled in the art to which the invention pertains.

SUMMARY OF THE INVENTION

The present invention overcomes the drawbacks associated with prior overwriting ink compositions in that the particular colorless undercolor coloring composition made according to the invention may be altered to reveal the color of the colorant in the undercolor coloring composition.

Advantageously, in one embodiment of the present invention, an overcolor composition makes a visible mark and thus, it may be used alone or in combination with an undercolor coloring composition.

In general, the present invention is a multiple composition system providing an undercolor coloring composition whose coloring effect may be revealed upon treatment with an overcolor second coloring composition, once the overcolor has been deposited over the colorless undercolor coloring composition. In one embodiment, the coloring system comprises an undercolor aqueous composition and an overcolor aqueous coloring composition, said undercolor aqueous coloring composition comprising an undercolor colorant which is in its colorless state at a high pH relative to the pH of said overcolor aqueous coloring composition, and an effective amount of a base to yield a pH of the composition sufficiently high to render the undercolor colorant colorless; said overcolor aqueous coloring composition comprising an effective amount of an acid sufficient to cause a color change of said undercolor aqueous coloring composition from the colorless state to reveal the color of said undercolor colorant upon contact of said overcolor with said undercolor colorant.

In another embodiment, the coloring system comprises an undercolor aqueous coloring composition and an overcolor aqueous coloring composition; said undercolor aqueous coloring composition comprising an undercolor colorant which is in its colorless state at a low pH relative to the pH of said overcolor aqueous coloring composition, and an effective amount of an acid to yield a pH of the composition sufficiently low to render the undercolor colorant colorless; said overcolor aqueous composition comprising an effective amount of a base sufficient to cause a color change from the colorless state to reveal the color of the colorant upon contact of said overcolor with said undercolor colorant. Ink and paint coloring composition systems further fall within the scope of the present invention, as do the individual coloring compositions.

In one preferred embodiment, the multiple coloring composition system comprises:

(a) an undercolor aqueous coloring composition comprising an undercolor colorant which is in its colorless state at a pH of about 10.0 or greater; and an effective amount of a base sufficient to yield a pH of about 10.0 or greater and/or a reducing agent; and (b) an overcolor aqueous coloring composition comprising an effective amount of acid sufficient to cause a color change from the colorless state to reveal the color of the colorant.

Suitable dyes for use in the high pH undercolor coloring composition include polymethine dyes, triphenylmethane dyes, cyanine dyes, methine dyes, and azo dyes which are colorless in the presence of a pH of about 10.0 or greater and/or are colorless in the presence of a reducing agent.

The low pH overcolor aqueous coloring composition may also contain a colorant. Suitable colorants for use in the overcolor coloring composition include pigments, polymethine dyes, triphenylmethane dyes, cyanine dyes, methine dyes, and azo dyes which are color stable in the presence of a pH of about 3.5 or less.

In another preferred embodiment, the multiple coloring composition system comprises:

(a) an undercolor aqueous coloring composition comprising an undercolor colorant which is in its colorless state at a pH of about 3.5 or less; and an effective amount of an acid sufficient to yield a pH of about 3.5 or less; and (b) an overcolor aqueous coloring composition comprising a reducing agent and/or an effective amount of base sufficient to cause a color change from the colorless state to reveal the color of the colorant.

Suitable dyes for use in the low pH undercolor coloring composition include xanthene dyes, pthalocyanine dyes, and azo dyes which are colorless in the presence of a pH of about 3.5 or less.

The high pH overcolor aqueous coloring composition may also contain a colorant. Suitable colorants for use in the overcolor coloring composition include pigments, xanthene dyes, pthalocyanine dyes, and azo dyes which are stable in the presence of a pH of about 10.0 or greater and/or in the presence of a reducing agent.

Also disclosed is an ink composition system comprising:

(a) an undercolor aqueous ink comprising an undercolor dye which is in its colorless state at a pH of about 10.0 or greater in an amount of from about 0.1% to about 15% by weight of said undercolor ink composition; a base in an amount of from about 0.1% to about 15% by weight of said undercolor ink composition; and a reducing agent in an amount of from about 1% to about 20% by weight of said undercolor ink composition; and (b) an overcolor aqueous ink comprising from about 1% to about 70% by weight of said overcolor ink of an acid.

Another embodiment of an ink composition is described comprising:

(a) an undercolor aqueous ink comprising an undercolor dye which is in its colorless state at a pH of 3.5 or less in an amount of from about 0.1% to about 15% by weight of said undercolor ink composition; and an acid in an amount of from about 1.0% to about 70% by weight of said undercolor ink composition;

(b) an overcolor aqueous ink comprising a reducing agent in an amount of from about 1% to about 20% by weight of said overcolor ink composition; and from about 0.5% to about 15% by weight of said overcolor ink of a base.

A color revealing marking system is also disclosed which comprises at least two marking instruments. The undercolor marking instrument contains an undercolor ink composition comprising a colorant which is in its colorless state at a relatively high pH, preferably a pH of about 10.0 or above, an effective amount of a base sufficient to yield a relatively high pH, preferably a pH of about 10.0 or greater, and from about 1% to about 20% by weight of said undercolor ink composition of a reducing agent. The overcolor writing instrument contains an overcolor ink. The overcolor ink comprises an effective amount of an acid to change the colorant in the undercolor ink composition from its colorless state to reveal the color of the colorant when the overcolor ink is applied to the undercolor ink. The overcolor ink may be colorless or may contain a colorant.

In another color revealing marking system composition which comprises at least two marking instruments, the undercolor marking instrument contains an undercolor ink comprising a colorant which is in its colorless state at a relatively low pH, preferably a pH of about 3.5 or less, and effective amount of acid sufficient to yield a relatively low pH, preferably a pH of about 3.5 or less. The overcolor writing instrument contains an overcolor ink composition comprising from about 1% to about 20% by weight of a reducing agent, and an effective amount of a base to change the colorant in the undercolor ink composition from its colorless state to reveal the color of the colorant when the overcolor ink is applied to the undercolor ink.

DETAILED DESCRIPTION OF THE INVENTION

The present invention imparts the desirable ease of application and convenience of use of traditional color changer systems while avoiding the strict limitations of current color change markers. The composition of the present invention therefore imparts improved and convenient coloring properties.

In general, the present invention is a multiple coloring composition system wherein the colorant is in its colorless state when initially laid down in a mark by an undercolor coloring composition, for example using a marker to dispense the composition. That mark may be overwritten and revealed by application of an overcolor coloring composition over the undercolor coloring composition.

The water used in both the undercolor and overcolor coloring compositions of the invention is preferably deionized water. The amount of water present in undercolor coloring compositions is typically from about 10% to about 90% and this amount is in large part determined by the desired end use of the undercolor coloring composition, for instance, as an ink or a paint, and the amount of other components included in the undercolor color composition. To achieve a desirable viscosity when the undercolor coloring composition is used in the form of, for example, an ink, water is preferably present in an amount of from about 35% to about 80%, and most preferably from about 40% to about 70% by weight of the composition.

The amount of water present in the overcolor coloring composition of the invention is also governed in large part by the desired end use of the composition, for instance, as an ink or a paint, and the amount of other components included in the overcolor coloring composition. The amount of water present in overcolor coloring compositions is typically from about 10% to about 90%. To achieve a desirable viscosity when the overcolor coloring composition is used in the form of, for example, an ink, water is preferably present in an amount of from about 25% to about 70%, and most preferably from about 35% to about 60% by weight of the composition.

Optionally, both the undercolor coloring composition and the overcolor coloring composition may comprise such additives as humectants, surfactants, drying agents and preservatives such as biocides and fungicides.

Addition of a humectant ensures that coloring compositions of the invention, when in the form of an ink, do not prematurely dry in a capillary marking system, such as a bonded fiber marking nib. Typical humectants which may be employed in the coloring compositions of the present invention include polyhydric alcohols such as ethylene glycol, propylene glycol, hexylene glycol and poly(ethylene glycol), and hydroxylated starches. The humectant is preferably glycerin.

The humectant is generally used in an amount of from about 0% to about 30% by weight of the composition, though this range is by no means critical. The amount of humectant to be added is determined by the type of nib used in the writing or marking instrument to be employed and the protection time period desired. In one preferred composition, the humectant, glycerin, is added In an amount of from about 15% to about 25% by weight of the coloring composition.

A surfactant may be added to the undercolor and overcolor coloring compositions. The function of the surfactant is to improve wetting and stabilize the dye.

Accordingly, when the surfactant is added to the undercolor or overcolor coloring compositions, it should preferably be included in an amount from about 2% to about 30% and most preferably in an amount from about 3% to about 30%.

The preferred surfactant for use in the undercolor and overcolor coloring compositions of the present invention include those manufactured by Dow Chemical Co. and sold under the trademark Dowfax™ 3B2. Other appropriate surfactants include Dowfax 8390 marketed by Dow Chemical Co. and Poly-tergent 3B2 marketed by Olin Chemical.

To achieve a more rapid drying rate and to improve marking characteristics upon nonporous materials, a drying agent may be added to increase the overall volatility and therefore the evaporation rate of the water and the pH regulant. Any compatible material which performs this function may be used.

The drying agent preferably should be a volatile polar material so as to ensure compatibility with the primary components of the marker ink. Straight chain C2–C4 alcohols are good, highly volatile drying agents, and of these, ethanol is preferred because of its relatively low cost and because it does not contribute any unpleasant odor to the composition. Alcohols can also provide added benefits, such as reducing surface tension, increasing adherence of the ink to porous surfaces, and providing bactericidal activity when added to the ink composition.

To discourage improper usage of the marker ink, such as ingesting the ink, the alcohol may contain a bittering agent or a conventional denaturant. An alcohol utilizing a bittering agent will discourage such improper usage of the ink by simply imparting a disagreeable taste, while not requiring the use of toxic denaturants as methanol or benzene, and is therefore preferred. A conventional denatured alcohol may, of course, also be utilized. The most preferred drying agent is an ethyl alcohol which contains a bittering agent and which is sold under the trade name SDA 40B, manufactured by Aaper Alcohol.

When utilized, the drying agent preferably is added from about 5% to about 30% by weight, with the most preferred concentration being from about 8 to about 10% by weight, though these amounts are not critical to the practice of the invention. About 8% per weight of drying agent is ordinarily required to ensure rapid drying of the ink on a nonporous surface, while amounts in excess of about 30% by weight may adversely affect stability of the ink and may cause flocculation of the pigment unless other stabilizing additives are employed.

To maintain the shelf life of the composition, a preservative may be added. The preservative preferably serves as both a bactericide and a fungicide, and is added in any effective amount, though a typical concentration range is from about 0.1% up to about 5% by weight. The use of preservatives in levels greater than about 5% by weight may cause the ink to become toxic or unstable and may, in any event, be unnecessary. Should alcohol be added to the composition as a drying agent, that alcohol will function as a preservative to some extent also.

Any conventional preservative may be utilized in the invention as long as there is compatibility with the remaining ink components. For example, preservatives manufactured by Dow Chemical Co. and sold under the trademarks Dowicil 75 (1-(3-chloroallyl)-3,5,7-triaza-1-azoniaadamantane chloride) and Dowicil 200 (3-chlorovinylhexamethylene tetrammonium chloride) or a preservative manufactured by Rohm and Haas and sold under the trademark Kathon PFM (isothiazolinones), or a preservative manufactured by Sutton Labs and sold under the trademark Germall II (imazolidinyl urea), or a preservative manufactured by Merck and sold under the trademark Tektamer 38 (1,2 dibromo-2, 4-dicyanobutane), will work in the composition of the invention.

Other acceptable preservatives include TROYSAN POLYPHASE P100™, a 3-Iodo-2-Propynyl Butyl Carbamate sold by Troy Chemical which is commonly solubilized by mixing with PVP K-30™, a 2-Pyrrolidinone, 1-Ethenyl-, Homopolymer solubilizer (($C_6MgNO$)$_x$ sold by ISP Technologies Inc., and M-PYROL™, a 1-Methyl-Pyrrolidinone solubilizer sold by GAF Chemicals Corporation. Addition of preservatives to the undercolor and overcolor coloring compositions inhibits the growth of bacteria and fungi in water-based products.

In one embodiment of the invention, a low pH overcolor composition is applied to a mark made by a high pH undercolor composition to alter the color in the undercolor coloring composition from its colorless state at relatively high pH, preferably a pH of about 10.0 or above, to its colored state, preferably by lowering the pH to below about 10.0. In a second embodiment of the invention, a high pH overcolor composition is applied to a mark made by a low pH undercolor composition to alter the color in the undercolor coloring composition from its colorless state at a relatively low pH, preferably a pH of about 3.5 or less, to its colored state, preferably by raising the pH to above about 3.5. These pH ranges are by no means critical, and may depend on the specific dye employed in the undercolor coloring composition.

A first undercolor coloring composition of the invention comprises a colorant which is in its colorless state at a pH of about 10.0 or above and an effective amount of base sufficient to yield a pH of 10.0 or greater. A reducing agent may be used in place of the base or in addition to the base. Due to the elevated pH of the first undercolor coloring composition, this embodiment is termed the high pH undercolor coloring composition.

Most suitable for use as dyes in the high pH undercolor coloring compositions are dyes which are in a colorless state in the presence of a pH of about 10.0 or greater. Also suitable for use as dyes in the high pH undercolor coloring compositions are dyes which are in a colorless state in the presence of a reducing agent. Especially suitable for use as dyes in the high pH undercolor coloring composition are polymethine dyes, triphenylmethane dyes, cyanine dyes, methine dyes, and azo dyes which are in a colorless state in the presence of a pH of about 10.0 or greater and/or are in a colorless state in the presence of a reducing agent. Such dyes include the dyes marketed under the tradenames BASACRYL X-RL YELLOW™ (Basic Yellow 49), Acid Blue 93 marketed by Spectra Color Corporation, Basic Green 4 marketed by Miles, Inc., Acid Violet 19 marketed by Spectra Color, as well as mixtures thereof.

To achieve good coloring of undercolor coloring compositions, the minimum concentration of dye which will produce a workable ink is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of, for example, a marker ink, is about 15% by weight. The preferred concentration range for most applications is from about 1% to about 15% dye by weight of the composition. A concentration of about 1% to about 6% is even more preferred when the undercolor coloring composition is to be used as an ink for a typical marker to ensure good coloration.

Typical reducing agents for use in the high pH undercolor coloring composition include hydrogen sulfide, sodium sulfite, sodium bisulfite, and stannous chloride. The preferred reducing agent is $Na_2SO_3$ (sodium sulfite). A reducing agent is generally present in the high pH undercolor coloring composition in an amount from about 1% to about 20% by weight with a minimal amount required to keep the undercolor colorant in its colorless state and the maximum amount determined by the stability of the composition and the safety of the composition for use by children. Preferably, the reducing agent is contained in the high pH undercolor coloring composition in an amount of from about 4% to about 15% and most preferably in an amount of from about 8% to about 12% by weight of the coloring composition.

The high pH undercolor coloring composition of the invention may be formulated using only a reducing agent. The high pH undercolor coloring composition may also be formulated using only a base. However, the reducing agents used in the high pH undercolor coloring compositions of the invention perform most effectively in the presence of an elevated pH. To elevate the pH of the high pH undercolor coloring composition, a base is added. Preferably, reducing agents are present in combination with a base. When a high pH undercolor is overwritten by a low pH overcolor, the reducing agent appears to drive the reaction of the undercolor coloring composition from its colorless state to its colored state. Bases which may be used in the high pH undercolor coloring composition of the invention are typically strong bases, usually having a pH of from about 10.0 to about 12.0. Typical bases which may be employed in the high pH undercolor coloring composition include ammonium hydroxide, sodium hydroxide, and sodium carbonate. The preferred base is sodium hydroxide.

The base is generally present in the high pH undercolor coloring composition of the invention in an amount from about 0.5% to about 15% by weight. Preferably, the base is added to the high pH undercolor coloring composition in an amount sufficient to raise the pH of the composition to a pH of from about 10.0 to about 13.0. Preferably, the base is contained in the high pH undercolor coloring composition in an amount of from about 0.5% to about 5%, and most preferably from about 1% to about 3% by weight of the undercolor coloring composition.

Examples of high pH undercolor coloring compositions of the present invention when formulated as an ink are as follows. Quantities are in percent by weight of the total composition.

| High pH Undercolor Color Ink Examples | | |
| --- | --- | --- |
| Component | Example 1 Blue Ink % | Example 2 Yellow Ink % |
| Deionized Water | 52.27 | 49.27 |
| Glycerin | 24.48 | 24.48 |
| $Na_2SO_3$ | 10.20 | 10.20 |
| NaOH (5N soln) | 11.05 | 11.05 |
| Dye | | |
| Acid Blue 93 | 2.00 | — |
| Basic Yellow 49 | — | 2.00 |
| Surfactant Dowfax 3B2 | — | 3.00 |

The inks of examples 1 and 2 had acceptable working properties. For examples 1 and 2, the pH ranged from 12.0 to 12.7 and the density ranged from 9.6 to 9.8 pounds per gallon. For examples 1 and 2, the viscosity ranged from 3.5 to 4.2 centipoise.

A second undercolor coloring composition of the invention comprises a colorant which is in its colorless state at a pH of about 3.5 or less and an effective amount of acid sufficient to yield a pH of 3.5 or less. Due to the reduced pH of the second undercolor coloring composition, this embodiment is termed the low pH undercolor coloring composition.

Most suitable for use as dyes in the low pH undercolor coloring compositions are dyes which are in a colorless state in the presence of a pH of about 3.5 or less. Especially suitable for use as dyes in the low pH undercolor coloring composition are xanthene dyes, pthalocyanine dyes, and azo dyes which maintain their characteristic color in the presence of a pH of about 3.5 or less. Dyes which have been found to meet these criteria include the dyes marketed under the tradename PYRANINE 120™ marketed by Miles-(Mobay), Acid Blue 93 marketed by Spectra Colors, as well as mixtures thereof.

The low pH undercolor coloring composition of the invention is formulated using an acid. Acids which may be used in the low pH undercolor coloring compositions are typically strong acids, usually having a pH of from about 2 to about 4. Typical acids which may be employed include phosphoric acid, citric acid, acetic acid, and sulfuric acid. The preferred acid in the low pH undercolor coloring composition is phosphoric acid.

The acid is generally present in the low pH undercolor coloring composition of the invention in an amount from about 1.0% to about 70% by weight. Preferably, the acid is added to the low pH undercolor coloring composition in an amount sufficient to lower the pH of the composition to a pH of from about 2.0 to about 3.0.

Low pH Undercolor Color Ink Examples

| Component | Example 3 Yellow Ink % |
|---|---|
| Deionized Water | 70.52 |
| Glycerin | 24.48 |
| Citric Acid | 0.50 |
| Preservative | |
| Nuosept 95 | 0.50 |
| premix | 2.50 |
| Dye | 1.50 |
| Pyranine 120 | |

"Premix" in this and the following examples was a mixture of 96.04% M-Pyrol, 1.98% PVP K-30, and 1.98% TROYSAN POLYPHASE P100. The ink of example 3 had acceptable working properties. For example 3, the pH ranged from 3.0 to 3.5 and the density ranged from 8.8 to 9.0 pounds per gallon. For example 3, the viscosity ranged from 2.7 to 3.2 centipoise.

The overcolor compositions of the present invention may be formulated without a colorant, in which case they will appear as colorless or nearly colorless compositions. Alternately, the overcolor coloring compositions may include a colorant. When the overcolor composition is formulated without a colorant, it may be referred to as a "developer."

A first overcolor coloring composition of the invention comprises an acid present in a sufficient amount to alter the colorant in the undercolor coloring composition from its colorless state to its colored state. Due to the reduced pH of the first overcolor coloring composition, this embodiment is termed the low pH overcolor coloring composition.

The low pH overcolor coloring composition of the invention is formulated using an acid. Acids which may be used in the low pH overcolor coloring composition are typically strong acids, usually having a pH of from about 2 to about 4. Typical acids which may be employed include phosphoric acid, citric acid, acetic acid, and sulfuric acid. The preferred acid in the low pH overcolor coloring composition is citric acid.

The acid is generally present in the low pH overcolor coloring composition of the invention in an amount from about 1% to about 70% by weight. Preferably, the acid is added to the low pH overcolor coloring composition in an amount sufficient to lower the pH of the composition to a pH of from about 2.0 to about 3.5.

Additionally, the low pH overcolor aqueous coloring composition may further comprise a colorant. In this embodiment of the invention, an overcolor colorant is selected which is capable of maintaining its characteristic color when exposed to a pH of about 3.5 or less. An acid is added to the overcolor coloring composition to yield a pH of about 3.5 or less.

Especially suitable for use as colorants in the low pH overcolor coloring composition are pigments, polymethine dyes, triphenylmethane dyes, cyanine dyes, methine dyes, and azo dyes which are stable in the presence of a pH of about 3.5 or less. Such dyes include the dyes marketed under the tradenames BASACRYL X-RL YELLOW™ (Basic Yellow 49), marketed by the BASF Corporation, ASTRAZON BLUE FRR™ (Basic Blue 69), ASTRAZON BRILLIANT RED 4G™ (Basic Red 14), and ASTRAZON PINK FBB™ (Basic Red 49) by Miles(Mobay); and the dyes marketed under the tradenames Acid Green 3 by International Dyestuffs Corporation, Acid Blue 93 and Acid Violet 19 marketed by Spectra Color Corporation as well as mixtures thereof.

The listed ASTRAZON dyes are classified as polymethine dyes. Polymethine dyes are colored substances in which a series of —CH= (methine) groups connect to terminal groups of a chromophore. Polymethine and cyanine are often used interchangeably as generic terms for all polymethine dyes. The previous primary usage for polymethine dyes are dying acetate rayon as well as polyacrylnitrile and polyacrylamide. Acid Green 3, Acid Blue 93 and Acid Violet 19 are triphenylmethane dyes. Acid Green 3 is commonly used in making pulp colors or lakes. Acid Violet dyes are primarily fashion colors.

To achieve good coloring of overcolor coloring compositions, the minimum concentration of dye which will produce a workable ink is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of, for example, a marker ink, is about 15% by weight. The preferred concentration range for most applications is from about 1% to about 15% dye by weight of the composition. A concentration of about 1% to about 4% is even more preferred when the overcolor coloring composition is to be used as an ink for a typical marker to ensure good coloration.

| Low pH Overcolor Color Ink Examples | | |
|---|---|---|
| Component | Example 4 Colorless Ink % | Example 5 Green Ink % |
| Deionized Water | 42.52 | 44.5 |
| Glycerin | 24.48 | 20.0 |
| Phosphoric Acid (85%) | 30.00 | 30.0 |
| Preservative | | |
| Nuosept 95 | 0.50 | 0.50 |
| premix | 2.50 | 2.50 |
| Dye | | |
| Acid Green 3 | — | 1.5 |
| Citric Acid | — | 1.0 |

The low pH overcolor ink of example 4 had acceptable working properties. The overcolor ink of example 5 contains a colorant and is acceptable for use as a low pH overcolor coloring composition. For example 4, the pH ranged from 2.0 to 3.5 and the density ranged from 9.1 to 9.3 pounds per gallon.

A second overcolor coloring composition of the invention comprises a base present in a sufficient amount to alter the colorant in the undercolor coloring composition from its colorless state to its colored state. A reducing agent may be used in place of or in addition to the base. Due to the elevated pH of the overcolor coloring composition, this embodiment of the overcolor coloring composition is termed the high pH overcolor coloring composition.

Additionally, the high pH overcolor aqueous coloring composition may further comprise a colorant. In this embodiment of the invention, an overcolor colorant is selected which is capable of maintaining its characteristic color when exposed to a pH of about 10.0 or greater. A base is added to the overcolor coloring composition to yield a pH of about 10.0 or greater.

The high pH overcolor coloring composition used to overwrite the low pH undercolor coloring composition can be formulated with a colorant which maintains its characteristic color in the presence of a pH of about 10.0 or greater and/or a reducing agent.

Dyes to be used in the high pH overcolor coloring composition must be highly resistant to chemical attack such as from a reducing agent or high pH conditions. Dyes meeting this criteria include xanthene dyes, pthalocyanine dyes, and azo dyes which maintain their characteristic color in the presence of a pH of about 10.0 or greater and/or are stable in the presence of a reducing agent. Dyes which have been found to meet these criteria include PYRANINE 120™ marketed by Miles(Mobay), Acid Red 52 marketed by Carolina Color, Food Red 14 marketed by Hilton-Davis, BASANTOL GREEN 910™ marketed by BASF, Acid Red 87 marketed by Hilton-Davis, Acid Red 92 marketed by International Dyestuffs Corporation, Acid Red 388 and Direct Blue 199 marketed by Crompton & Knowles, and mixtures thereof.

Acid Red dyes, classified as xanthene dyes, are generally used as colorants for foods, drugs and cosmetics. Specifically, Acid Red 87, is the disodium salt of 2,4,5,7-tetrabromo- 9-o-carboxyphenyl-6-hydroxy -3-isoxanthone. Acid Red 87 is also called D & C Red No. 22 by the Food and Drug Administration ("FDA"), and sold under the tradenames Eosine YS and Eosine G. In addition, Acid Red 92, the disodium salt of 2,4,5,7-tetrabromo-9-3,4,5,6 tetrachloro-o-carboxylphenyl)- 6-hydroxy-3-isoxanthone, is called D & C Red No. 28 by the FDA, and sold under the tradename Phloxine B. Acid Red 52 is a colorant for plastics. Further, Food Red 14 or FD&C Red No. 3, commercially available under the tradenames Erythrosine and Erythrosine Bluish, is the disodium salt of 9(o-carboxyphenyl)-6-hydroxy-2,4,5,7-tetraiodo- 3H-xanthen-3-one, which contains smaller amounts of lower iodinated fluoresceins.

Typical reducing agents for use in the high pH overcolor coloring composition include hydrogen sulfide, sodium sulfite, sodium bisulfite, and stannous chloride. The preferred reducing agent is $Na_2SO_3$ (sodium sulfite). A reducing agent is generally present in the high pH overcolor coloring composition in an amount from about 1% to about 20% with a minimal amount required to alter the colorant in the undercolor coloring composition from its colorless state to its colored state and the maximum amount determined by the stability of the composition and the safety of the composition for use by children. Preferably, the reducing agent is contained in the high pH overcolor coloring composition in an amount of from about 2% to about 15%, and most preferably in an amount of from about 8% to about 12% by weight of the coloring composition.

The high pH overcolor coloring composition of the invention may be formulated using only a reducing agent. The high pH overcolor coloring composition may also be formulated using only a base. However, the reducing agents used in the high pH overcolor coloring compositions of the invention perform most effectively in the presence of an elevated pH. To elevate the pH of the overcolor coloring composition, a base is added. Preferably, reducing agents are present in combination with a base. When a high pH overcolor overwrites a low pH undercolor, the reducing agent appears to drive the reaction of the undercolor coloring composition from its colorless state to its colored state. Bases which may be used in the high pH overcolor coloring composition of the invention are typically strong bases, usually having a pH of from about 10.0 to about 12.0. Typical bases which may be employed in the high pH overcolor coloring composition include ammonium hydroxide, sodium hydroxide, and sodium carbonate. The preferred base is sodium hydroxide.

The base is generally present in the high pH overcolor coloring composition of the invention in an amount from about 0.5% to about 15% by weight. Preferably, the base is added to the high pH overcolor coloring composition in an amount sufficient to raise the pH of the composition to a pH of from about 10.0 to about 12.0. Preferably, the base is contained in the high pH overcolor coloring composition in an amount of from about 0.5% to about 4%, and most preferably from about 1% to about 3% by weight of the overcolor coloring composition.

| High pH Overcolor Color Ink Examples | | |
|---|---|---|
| Component | Example 7 Colorless Ink % | Example 8 Yellow Ink % |
| Deionized Water | 60.75 | 58.8 |
| Glycerin | 15.00 | 15.0 |
| $Na_2SO_3$ | 10.20 | 10.2 |
| NaOH (5N soln) | 11.05 | 11.0 |
| Dye Pyranine 120 | — | 2.0 |
| Surfactant Dowfax 3B2 | 3.00 | 3.0 |

The high pH overcolor ink of example 7 had acceptable working properties. The overcolor ink of example 8 contains a colorant and is acceptable for use as a high pH overcolor coloring composition. For example 7, the pH ranged from 11.5 to 12.2 and the density ranged from 9.6 to 9.8 pounds per gallon. For example 7, the viscosity ranged from 4.0 to 4.3 centipoise.

One coloring composition system of the present invention utilizes a combination of a high pH undercolor coloring composition with a low pH overcolor coloring composition in a marking system comprising:

(a) an undercolor aqueous coloring composition comprising an undercolor colorant which is in its colorless state at a pH of about 10.0 or greater; and an effective amount of a base sufficient to yield a pH of about 10.0 or greater and/or a reducing agent; and (b) an overcolor aqueous coloring composition comprising an effective amount of an acid sufficient to cause a color change of the undercolor composition from the colorless state to reveal the color of the colorant in the undercolor coloring composition when the overcolor contacts the undercolor.

In a preferred embodiment, the high pH undercolor coloring composition comprises both a reducing agent and a base in an amount sufficient to elevate the pH of the high pH undercolor coloring composition to about 10.0 or greater and preferably from about 11.0 to about 12.0. In this preferred embodiment, the marking system comprises:

(a) an undercolor aqueous coloring composition comprising an undercolor colorant which is in its colorless state at a pH of about 10.0 or greater; an effective amount of a base sufficient to yield a pH of 10.0 or greater; and from about 1% to about 20% by weight of a reducing agent; and (b) an overcolor aqueous coloring composition comprising an effective amount of an acid sufficient to cause a color change from the colorless state to reveal the color of the colorant when the overcolor contacts the undercolor.

The invention can also utilize a combination of a low pH undercolor coloring composition and a high pH overcolor coloring composition in a marking system comprising:

(a) an undercolor aqueous coloring composition comprising an undercolor colorant which is in its colorless state at a pH of about 3.5 or less; and an effective amount of an acid sufficient to yield a pH of 3.5 or less; and (b) an overcolor aqueous coloring composition comprising a reducing agent and/or an effective amount of base sufficient to cause a color change of the undercolor coloring composition from the colorless state to reveal the color of the colorant in the undercolor coloring composition when the overcolor contacts the undercolor.

In a preferred embodiment, the high pH overcolor coloring composition comprises both a reducing agent and a base in an amount sufficient to elevate the pH of the high pH overcolor coloring composition to about 10.0 or greater and preferably from about 11.0 to about 12.0. In this preferred embodiment, the marking system comprises:

(a) an undercolor aqueous coloring composition comprising an undercolor colorant which is in its colorless state at a pH of about 3.5 or less; an effective amount of an acid sufficient to yield a pH of 3.5 or less; and (b) an overcolor aqueous coloring composition comprising from about 1% to about 20% by weight of a reducing agent and an effective amount of a base sufficient to cause a color change of the undercolor coloring composition from the colorless state to reveal the color of the colorant in the undercolor coloring composition when the overcolor contacts the undercolor.

Typically, a child may make marks or color a picture using one or more markers containing various high pH undercolor coloring compositions on a suitable substrate, such as paper. The child may then select one or more markers containing various low pH overcolor coloring compositions of the invention. The child may then overwrite a portion or all of the previously made markings changing the color of the high pH undercolor coloring composition to reveal the color of the colorant in the high pH coloring composition. Because of the surprisingly strong and immediate impact of the low pH overcolor coloring composition used to overwrite the high pH undercolor coloring composition, the overcolor marker appears to paint a color over the undercolor on the portions of the substrate on which it is applied.

The child can also overwrite the high pH undercolor coloring composition using a low pH overcolor which contains a colorant. Where the previous markings from the high pH undercolor coloring composition are overwritten, the color of the colorant in the undercolor is revealed and blended with the color of the colorant in the low pH overcolor coloring composition. When the low pH overcolor overwrites the high pH undercolor, both colorants contained in the compositions are stable and therefore, a mixture of the low pH overcolor colorant and high pH undercolor colorant is visible to the child. Where a low pH overcolor coloring composition containing a colorant has been applied directly to the substrate, the color of the colorant in the low pH overcolor coloring composition can been see by the child.

The child may also use a low pH undercolor coloring composition in combination with a high pH overcolor coloring composition to produce a different set of colors. Where the low pH undercolor coloring composition is overwritten by a high pH overcolor coloring composition that does not contain a colorant, the color of the colorant in the low pH undercolor coloring composition is revealed. However, where the low pH undercolor is overwritten by a high pH overcolor coloring composition containing a colorant, a mixture of the low pH undercolor colorant and high pH overcolor colorant is visible.

Preferably, when the coloring compositions of the invention are used in the form of inks, the inks are placed in conventional markers using such nibs as bonded fiber or sintered plastic. Various undercolor coloring compositions are placed in an undercolor set of markers, each containing an appropriate different color dye. Various overcolor coloring compositions of the invention are placed in a second group of markers, each of these compositions may contain an appropriate different color dye.

A marker typically comprises a hollow tubular shaft, which serves both as a handle for the marking instrument and as a reservoir for the ink; a nib at the end of the handle; and a cap that covers the nib when the marking instrument is not in use. The cap and handle may be of any number of materials, such as plastic. Preferably, the cap completely covers the nib so that the nib does not dry out.

A capillary marker has a reservoir and a capillary nib. The reservoir of a typical capillary marker is an absorbent body stored in the handle of the marker. The reservoir contains the ink charge of the marker, and is capable of transferring ink to the capillary nib. The nib of a capillary marker has one end in contact with the reservoir and a writing tip as its other end. The nib wicks the ink from the reservoir to its writing tip. The writing tip of the nib is drawn across the surface to be marked to dispense the fluid on the surface. The nib may be made of suitable capillary materials, such as polyester fibers.

In using the various above described overcolor coloring compositions and undercolor coloring compositions, a child could place a colorless mark of the undercolor coloring composition on paper, perhaps in the shape of the sun or tress. In order to make the yellow sun or green trees visible, the child overwrites the undercolor with an overcolor coloring composition. Furthermore, by using an overcolor coloring composition containing a colorant, the child can paint the blue sky using the overcolor colorant while revealing the sun as a blend of the undercolor and overcolor colorants.

The multiple coloring composition system of the invention may also be formulated as a paint. When compositions of the invention are formulated as a paint, such as a child's paint, they must necessarily be formulated with a higher viscosity to enable to the application of the of the paint with a brush. This viscosity is achieved in two ways. In formulating an undercolor coloring composition, a binder may generally be added to the composition. This binder may be in the form of a modified starch such as STADEX 140™ marketed by A. E. Staley Manufacturing Company. Binders are typically used in amounts of from about 0% to about 25% by weight of the composition.

Additionally, paints may contain a thickener to provide body to the paint. One suitable thickener is STAR-POL™ 560, a modified starch thickener, marketed by A. E. Staley Manufacturing Company. Another suitable thickener, especially for use in elevated pH compositions such as the overcolor coloring composition of the invention is LAPONITE RDS™, a synthetic hectorite The amount of thickener used depends upon the amounts of binder and other components used in the composition, although typically about 1% to about 10% by weight thickener is used and preferably about 1% to about 5% is used.

Paints may also contain a filler or extender. Fillers and extenders are generally solid particles added to paint compositions which provide body to the paint but which do not provide color. Common extenders are talcs, such as magnesium silicate hydrate, and clays and two suitable extenders for compositions of the invention are TALCRON MP™ 45-26 marketed by Pfizer Inc. and IMSIL A-108™. Extenders may be used in amounts of from about 0% to about 40% by weight of the composition. Where extenders or pigments are used in a paint, a dispersant may also be used to maintain the solid particles dispersed in the paint. Dispersants, such as NOPCOSPERSE 44™, are typically used in amounts of from about 0.1% to about 5%. Also, many paints optionally include a freeze/thaw protector. Freeze/thaw additives improve the stability of the paint over widely varying temperatures. One suitable freeze/thaw protector is propylene glycol which is effective when used in compositions of the invention in amounts from about 1% to about 10% by weight, with the most preferred range being from about 1.5% to about 6.5% by weight.

|  | Paint Examples | |
|---|---|---|
| Component | High pH Undercolor Paint Example 1 % | Low pH Overcolor Paint Example 2 % |
| Deionized Water | 49.2 | 59.9 |
| Propylene Glycol | 3.0 | 3.0 |
| Binder | 8.0 | 8.0 |

|  | Paint Examples | |
|---|---|---|
| Component | High pH Undercolor Paint Example 1 % | Low pH Overcolor Paint Example 2 % |
| Stadex 140 Thickener |  |  |
| Stanpol 560 | 1.7 |  |
| Laponite RDS |  | 3.0 |
| Dispersant Nopcosperse 44 | 0.2 | 0.2 |
| Extender |  |  |
| Talenov MP 45-26 | 20.0 |  |
| Imsil A-108 | 9.0 | 10.0 |
| Reducing agent Sodium Sulphite | 6.0 |  |
| Base Sodium Hydroxide | 1.0 |  |
| Acid Phosphoric Acid (85%) |  | 15.0 |
| Preservatives |  |  |
| Kathon LX | 0.2 | 0.2 |
| Nuosept 95 | 0.3 | 0.3 |
| Troysan Polyphase EC-17 | 0.4 | 0.4 |
| Astrazon Blue FRR Dye | 1.0 | — |

From the foregoing description and examples, it is apparent that the objects of the present invention have been achieved. While only certain embodiments have been set forth, alternative embodiments and various modifications will be apparent to those skilled in the art. These and other alternatives are considered equivalents and within the spirit and scope of the present invention. All references and previous applications cited herein are hereby incorporated by reference in their entireties.

What is claimed is:

1. A coloring system comprising an undercolor aqueous coloring composition and an overcolor aqueous coloring composition, said undercolor aqueous coloring composition comprising an undercolor colorant which is in its colorless state at a high pH relative to the pH of said overcolor aqueous coloring composition, and an effective amount of a base to yield a pH of the composition sufficiently high to render the undercolor colorant colorless;

said overcolor aqueous coloring composition comprising an effective amount of an acid sufficient to cause a color change of said undercolor aqueous coloring composition from the colorless state to reveal the color of said undercolor colorant upon contact of said overcolor with said undercolor colorant.

2. A coloring system comprising an undercolor aqueous coloring composition and an overcolor aqueous coloring composition;

said undercolor aqueous coloring composition comprising an undercolor colorant which is in its colorless state at a low pH relative to the pH of said overcolor aqueous coloring composition, and an effective amount of an acid to yield a pH of the composition sufficiently low to render the undercolor colorant colorless;

said overcolor aqueous composition comprising an effective amount of a non-volatile base sufficient to cause a color change from the colorless state to reveal the color of the colorant upon contact of said overcolor with said undercolor colorant.

3. A coloring system comprising:
(a) an undercolor aqueous coloring composition comprising an undercolor colorant which is in its colorless state at a pH of about 10.0 or greater; and an effective amount of a base sufficient to yield a pH of the composition of about 10.0 or greater; and
(b) an overcolor aqueous composition comprising an effective amount of an acid sufficient to cause a color change of said undercolor aqueous coloring composition from the colorless state to reveal the color of said undercolor colorant upon contact of said overcolor with said undercolor colorant.

4. A coloring system according to claim 3, wherein said overcolor coloring composition contains a colorant.

5. An aqueous multiple coloring composition system comprising:
(a) an undercolor aqueous coloring composition comprising an undercolor colorant which is in its colorless state at a pH of about 3.5 or below; and an effective amount of an acid sufficient to yield a pH of 3.5 or below; and
(b) an overcolor aqueous composition comprising an effective amount of a non-volatile base sufficient to cause a color change from the colorless state to reveal the color of the colorant upon contact of said overcolor with said undercolor colorant.

6. A coloring system according to claim 5, wherein said overcolor coloring composition contains a colorant.

7. An ink composition system comprising:
(a) an undercolor aqueous ink composition comprising an undercolor colorant which is in its colorless state at a high pH in an amount of from about 0.1 to about 15% by weight of said undercolor coloring composition; a base in an amount of from about 0.1 to about 15% by weight of said undercolor coloring composition to yield a pH greater than 10.0; and a reducing agent in an amount of from about 1% to about 20% by weight of said first composition; and
(b) a second aqueous ink composition comprising an acid in an amount from about 1% to about 70% by weight of said second composition to change the colorant from its colorless state to reveal the color of the colorant.

8. An ink composition system comprising:
(a) a first aqueous ink composition comprising an undercolor colorant which is in its colorless state at a low pH in an amount of from about 0.1% to about 15% by weight of said first composition; and an acid in an amount of from about 1% to about 70% by weight of said first composition to yield a pH less than 3.5; and
(b) a second aqueous ink composition comprising a reducing agent in an amount of from about 1% to about 20% by weight of said second composition; and a non-volatile base in an amount of from about 0.1% to 15% by weight of said second composition to change the colorant from its colorless state to reveal the color of the colorant.

9. A color revealing marking system comprising at least an undercolor marking instrument which dispenses a colorless mark and an overcolor marking instrument which develops said colorless mark, said undercolor marking instrument containing a first ink composition comprising a colorant which is in its colorless state at a high pH, an effective amount of a base sufficient to yield a pH greater than 10.0, and from about 1% to about 20% by weight of a reducing agent; and said overcolor marking instrument containing a second ink composition comprising an effective amount of an acid to change the colorant in the first ink composition to its colorless state to reveal the color of the colorant.

10. A color revealing marking system comprising at least an undercolor marking instrument which dispenses a colorless mark and an overcolor marking instrument which develops said colorless mark, said undercolor marking instrument containing a first ink composition comprising a colorant which is in its colorless state at a low pH, and an effective amount of an acid sufficient to yield a pH less than 3.5; and said overcolor marking instrument containing a second ink composition comprising from about 1% to about 20% by weight of a reducing agent, and an effective amount of a base to change the colorant in the first ink composition to its colorless state to reveal the color of the colorant.

11. A paint composition system comprising:
(a) a first aqueous paint comprising an undercolor colorant which is in its colorless state at a high pH in an amount of from about 0.1 to about 15% by weight of said first composition; a base in an amount of from about 0.1 to about 15% by weight of said first composition to yield a pH greater than 10; a reducing agent in an amount of from about 1% to about 20% by weight of said first composition, and a thickener in an amount from about 1% to 5% by weight; and
(b) a second aqueous paint comprising an acid in an amount from about 1% to about 70% by weight of said second composition to change the colorant from its colorless state to reveal the color of the colorant, and a thickener in an amount from about 1% to 10% by weight.

12. A paint composition system comprising:
(a) a first aqueous paint comprising an undercolor colorant which is in its colorless state at a low pH in an amount of from about 0.1% to about 15% by weight of said first composition; an acid in an amount of from about 1% to about 70% by weight of said first composition to yield a pH less than 3.5; and a thickener in an amount from about 1% to 10% by weight; and
(b) a second aqueous paint comprising a reducing agent in an amount of from about 1% to about 20% by weight of said second composition; a base in an amount of from about 0.1% to 15% by weight of said second composition to change the colorant from its colorless state to reveal the color of the colorant, and a thickener in an amount from about 1% to 10% by weight.

13. A paint composition system according to claim 12, wherein said overcolor paint composition contains a colorant.

14. A color revealing marking system comprising at least a first undercolor marking instrument which dispenses a colorless mark and at least one overcolor marking instrument develops said colorless mark, said undercolor marking instrument containing a first ink composition comprising a colorant which is in its colorless state at a low pH, and an effective amount of an acid sufficient to yield a pH less than 3.5; and said overcolor marking instrument containing a second ink composition comprising from about 1% to about 20% by weight of a reducing agent, and an effective amount of a base to change the colorant in the first ink composition to its colorless state to reveal the color of the colorant.

15. A color revealing marking system comprising at least a first undercolor marking instrument which dispenses a colorless mark and at least one overcolor marking instrument develops said colorless mark, said undercolor marking instrument containing a first ink composition comprising a colorant which is in its colorless state at a high pH, an effective amount of a base sufficient to yield a pH greater than 10, and from about 1% to about 20% by weight of a reducing agent; and said overcolor marking instrument containing a second ink composition comprising an effective amount of an acid to change the colorant in the first ink composition to its colorless state to reveal the color of the colorant.

* * * * *